US011625294B2

(12) United States Patent
Bramble

(10) Patent No.: US 11,625,294 B2
(45) Date of Patent: Apr. 11, 2023

(54) TECHNIQUES TO PROVIDE SELF-HEALING DATA PIPELINES IN A CLOUD COMPUTING ENVIRONMENT

(71) Applicant: Capital One Services, LLC, McLean, VA (US)

(72) Inventor: Patrice Bramble, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/331,846

(22) Filed: May 27, 2021

(65) Prior Publication Data
US 2022/0382620 A1 Dec. 1, 2022

(51) Int. Cl.
*G06F 11/00* (2006.01)
*G06F 11/07* (2006.01)
*G06N 20/00* (2019.01)

(52) U.S. Cl.
CPC ...... *G06F 11/0793* (2013.01); *G06F 11/0706* (2013.01); *G06F 11/0751* (2013.01); *G06F 11/0787* (2013.01); *G06N 20/00* (2019.01)

(58) Field of Classification Search
CPC ............ G06F 11/0703; G06F 11/0706; G06F 11/0709; G06F 11/0751; G06F 11/0766; G06F 11/0778; G06F 11/0787; G06F 11/0793; G06F 11/2257; G06F 11/2263; G06F 11/3006; G06F 11/3048; G06F 9/30079; G06F 9/3861; G06N 20/00
See application file for complete search history.

(56) References Cited

U.S. PATENT DOCUMENTS

| 10,503,427 | B2 | 12/2019 | Botes et al. |
| 10,678,225 | B2 | 6/2020 | Kidd et al. |
| 10,771,489 | B1 * | 9/2020 | Bisht ...................... G06N 20/00 |
| 2015/0325315 | A1 * | 11/2015 | Rakitzis ................ G06F 11/073 714/6.31 |
| 2019/0324841 | A1 * | 10/2019 | Patel ...................... G06N 5/022 |
| 2020/0183788 | A1 * | 6/2020 | Dreyfuss ............. G06F 11/0775 |
| 2021/0342214 | A1 * | 11/2021 | Madawat ............ G06F 11/3006 |

FOREIGN PATENT DOCUMENTS

CN 109144762 A * 1/2019 .......... G06F 11/0793

* cited by examiner

*Primary Examiner* — Anthony J Amoroso
(74) *Attorney, Agent, or Firm* — KDM Firm PLLC

(57) ABSTRACT

Embodiments may generally be directed to systems and techniques to detect failure events in data pipelines, determine one or more remedial actions to perform, and perform the one or more remedial actions.

20 Claims, 10 Drawing Sheets

MAPPINGS 204

| Error Type | Immediate_Action0 | Immediate_ActionN | Fatal_Action |
|---|---|---|---|
| COMPLETE_REGION_FAILURE | SYSTEM_FAILOVER_TO_SECONDARY | | NOTIFY_STAKEHOLDERS |
| S3_OUTAGE | SYSTEM_FAILOVER_TO_SECONDARY | | NOTIFY_STAKEHOLDERS |
| CLUSTER_INSUFFICIENT_IP_AVAIL | CYCLE_SUBNET | CYCLE_SUBNET | NOTIFY_STAKEHOLDERS |
| CLUSTER_INSUFFICIENT_INSTANCE_AVAIL | DELAY_X_MIN → CYCLE_SUBNET | CYCLE_SUBNET | SYSTEM_FAILOVER_TO_SECONDARY |
| UPSTREAM_DATA_NOT_EXISTS | DELAY_X_MIN → RETRY | RETRY | NOTIFY_STAKEHOLDERS |
| API_SERVER_ERROR | DELAY_X_MIN → RETRY | RETRY | OPEN_TICKET_API (can mimic paging API team) |
| DEPENDENCY_TIMEOUT | DELAY_X_MIN → RETRY | OPEN_TICKET_API (can mimic paging API team) | NOTIFY_STAKEHOLDERS |
| ACCESS_DENIED | | | NOTIFY_STAKEHOLDERS |

{ Error Type rows COMPLETE_REGION_FAILURE through CLUSTER_INSUFFICIENT_INSTANCE_AVAIL: INFRASTRUCTURE TYPE }
{ Error Type rows UPSTREAM_DATA_NOT_EXISTS through ACCESS_DENIED: DEPENDENCY TYPE }
{ Immediate_Action0, Immediate_ActionN, Fatal_Action columns: REMEDIAL ACTIONS 216 }

FIG. 3A

MAPPINGS 204

| Error Type | Immediate_Action0 | Immediate_ActionN | Fatal_Action |
|---|---|---|---|
| MALFORMED_DATA | | | NOTIFY_STAKEHOLDERS |
| FAILED_DATA_QUALITY_I (internally produced) | EXTRACT_AND_LOG → RETRY | | NOTIFY_STAKEHOLDERS |
| FAILED_DATA_QUALITY_E (externally produced) | | | OPEN_TICKET_DATA → NOTIFY_STAKEHOLDERS |
| ACCESS_DENIED | | | NOTIFY_STAKEHOLDERS |

{ Error Type column } DATA ISSUE TYPE

{ Immediate_Action0, Immediate_ActionN, Fatal_Action columns } REMEDIAL ACTIONS 216

FIG. 3B

TECHNIQUES TO PROVIDE SELF-HEALING DATA PIPELINES IN A CLOUD COMPUTING ENVIRONMENT

BACKGROUND

Currently, various entities provide cloud computing services globally to different customers over various sectors for critical and non-critical applications. These entities provide cloud computing services, including, for example, Software-as-a-Service (SaaS), Infrastructure-as-a-Service (IaaS), and/or Platform-as-a-Service (PaaS). A cloud computing system typically includes a large cluster of servers distributed over one or more data centers to provide data protection, high availability, and high-performance computing and to otherwise provide sufficient quality of service (QoS) for successful service delivery.

These services typically use data pipelines to process data through the cloud computing systems and return results to customers. From time to time, the services and data pipelines may experience errors or failures. Today's solutions attempt to resolve these errors and failures by transferring or moving operations from one set of servers to another set of servers in a different location, e.g., a high availability failover. However, these solutions are costly and do not always resolve the errors or failures. Thus, embodiments discussed herein are directed to solving these problems.

BRIEF SUMMARY

Embodiments may be generally directed to systems, devices, and techniques, including a system having a data store to store a table comprising mappings of failure events to remedial actions, one or more processors coupled with the data store, and a memory comprising instructions. In embodiments, the instructions, that when executed by the one or more processors, cause the processor to detect a failure event in a data pipeline, perform a lookup in the table stored in the data store to determine a remedial action to perform for the failure event based on a mapping between the failure event and the remedial action, cause performance of the remedial action in an attempt to resolve the failure event, determine if the remedial action resolved the failure event, and in response to the remedial action resolving the failure event, log data associated with the failure event and the remedial action in a data log, and in response to the remedial action not resolving the failure event determine one or more additional remedial actions to perform by performing lookups in table and based on the failure event mapping to each of the one or more additional remedial actions until the failure event is resolved or a final remedial action is performed, and log data associated with the failure event, and the one or more remedial actions performed to resolve the failure event in the data log.

Embodiments may be generally directed to systems, devices, and techniques including a computer-implemented method including detecting a failure event in a data pipeline, determining a remedial action to perform for the failure event based on a mapping between the failure event and the remedial action stored in a data store, wherein the mapping comprises each of a plurality of failure events mapped to at least one remedial action, invoking the remedial action in an attempt to resolve the failure event, determining the remedial action resolved the failure event, and logging data associated with the failure event and the remedial action in a data log.

Embodiments may be generally directed to systems, devices, and techniques including a computer-implemented method including detecting a failure event in a data pipeline in a cloud computing environment, determining from a table comprising mappings between failure events and remedial actions, a remedial action to perform for the failure event based on a mapping between the failure event and the remedial action, performing the remedial action in an attempt to resolve the failure event, determining the attempt to resolve the failure event did not resolve the failure event, determining additional remedial actions to perform based on the mappings between the additional remedial actions and the failure event, performing each of the additional remedial actions until the failure event is resolved or a final remedial action is performed, and storing data associated with the failure event, and the one or more remedial actions performed to resolve the failure event in a data log.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 3A/3B illustrates an example of mappings 204 in accordance with embodiments.

DETAILED DESCRIPTION

Figure 1:
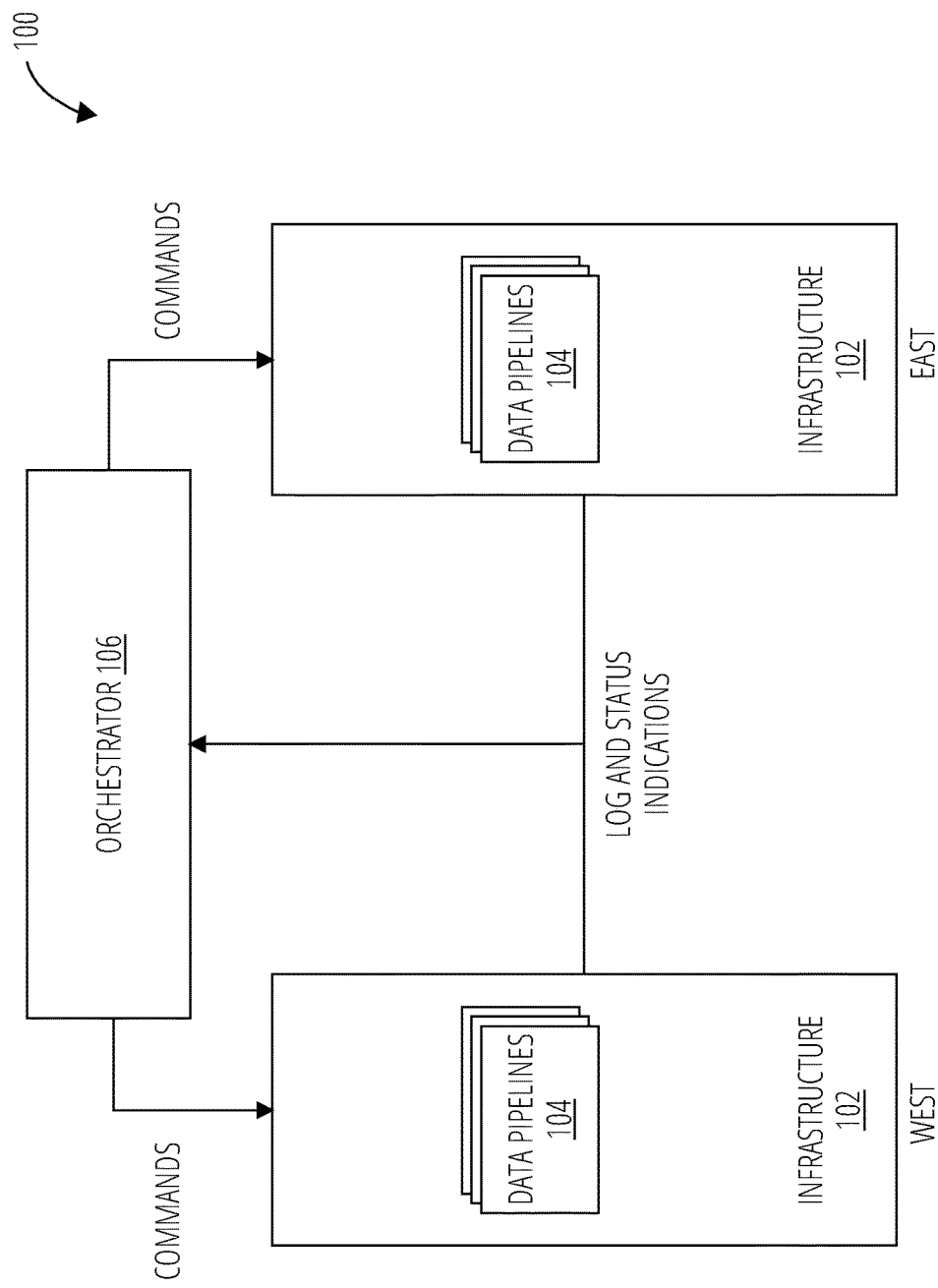
FIG. 1 illustrates an example of a computing system 100 in accordance with embodiments.

Embodiments may generally be directed to monitoring and controlling data pipelines in computing systems, such as those implemented in a cloud computing environment. Specifically, embodiments are directed to detecting failure events in data pipelines and performing one or more remedial actions to correct or resolve the failure. Data pipelines can experience errors or failure to execute for a variety of reasons—including but not limited to: lack of available Internet Protocol (IP) addresses, insufficient subnets on a network, a particular requested instance type being unavailable per region, service outage (i.e., Simple Storage Service (S3) down), Application Programming Interface (API) dependency being unavailable, job timeouts, upstream dataset not being available, etc. There is a wide range of failures, some focusing on the cloud infrastructure constraints, while others may be based on external dependencies or data availability.

Existing solutions include high availability setups that default to moving or invoking job pipelines in a different region when a failure event occurs. However, these solutions can be costly without addressing all the above scenarios. For example, suppose a job fails due to an API timeout. In that case, re-executing the data pipeline in a different region will have performance and cost impacts and may not address the job failure. Thus, the job will continue to fail even when relocated to a different set of servers and locations.

Embodiments discussed herein provide a more nuanced approach and strategically targeted a resolution based on the detected failure event or type of failure. For example, an approach may include built-in retry mechanisms that retry the data pipeline job when a failure event is detected. If the retry attempts fail, the pipeline can be triggered in a separate region given a cloud environment. Moreover, the remedial actions applied to the failure events can be specifically tailored, and different actions can be applied to different events. Over time, the system can also learn, via machine-learning, which actions work better than other actions for a particular event. This solution takes resiliency a step further by strategically identifying the corrective action that should take place in the case the pipeline failed to execute or if there is a job failure.

Embodiments may include generating and updating mappings between failure events and one or more remedial actions. The remedial actions may be defined into two separate categories, immediate actions or fatal actions. The immediate actions may be an intermediate action that is performed before the fatal action. Typically, an immediate action is less costly resource-wise and resolves the failure more quickly than a fatal action. For example, an immediate action can include a retry type along with the number of retry attempts. The fatal action may include the costliest step that the resolution process can take if the immediate actions fail. For example, a fatal action may be the data pipeline processing being transferred from one location to another location or contacting a system administrator to resolve the issue.

The mappings may first be determined based on historical knowledge and defined in a table in an order from most successful to least successful while taking processing and human costs into account. The fatal action may be performed when none of the immediate actions succeed. In some instances, the mappings may be defined by training a model with historical data, including historical failure events and remedial actions, to determine probabilities of success for the remedial actions. The mappings may then be defined in the table per their probability of success and associated costs and stored in a data store. In some instances, in an order based on the probability of success and associated costs. The associated costs may be used as a weight to determine which actions have a high probability of success (e.g., >70% success rate) and a low or lower cost. For example, if two actions have the same probability of success for a failure event, but one has a lower cost (processing and/or human) than the other, the mappings may be configured to act with the lower cost first. Over time, additional data may be collected, the model may be retrained, and the mappings and table may be updated to reflect the updated model trained with the new data. These and other details will become more apparent in the following description.

FIG. 1 illustrates an example of a computing system 100 in accordance with embodiments discussed herein. In one example, the computing system 100 may be a cloud computing environment configured to process jobs and data using on-demand resources, such as data storage (cloud storage) and processing power, without direct active management by the user. In one example, the cloud computing environment may be part of a third-party web services provider, such as Amazon's® Web Services (AWS), including Simple Storage Services (S3) and Elastic Compute Cloud (EC2). The resources may be allocated to perform jobs associated with data pipelines based on the needs or requirements of the jobs. In the illustrated example, the computing system 100 includes infrastructure 102, including the on-demand resources, e.g., the data storage and processing components. In operation, resources of the infrastructure 102 may be added or removed from the computing system 100 based on the storage and processing requirements for data pipelines 104 at any point in time.

In embodiments, the infrastructure 102 may be incorporated in one or more data centers which may be allocated to a specific user (enterprise cloud) or available to many users (public cloud) over the Internet. Further, large cloud computing environments are often distributed over multiple locations from central servers, e.g., the orchestrator 106. The illustrated computing system 100 includes infrastructure 102 in two different locations denoted as "WEST" and "EAST." However, embodiments are not limited in this manner; the computing system 100 may include infrastructure 102 in any number of locations and denoted in any manner.

In embodiments, the infrastructure 102 may include resources, such as storage, memory, one or processors, networking equipment, interfaces, and so forth to provide on-demand services to customers. Further, the infrastructure 102 may include one or more services that provide high-level APIs used to abstract various low-level details of underlying network infrastructure like physical computing resources, location, data partitioning, scaling, security, backup, etc. For example, the infrastructure 102 may include a hypervisor that runs virtual machines. In some instances, the infrastructure 102 may support pools of hypervisors within the cloud operating system. It can support large numbers of virtual machines and scale services up and down according to customers' varying requirements. In some instances, the infrastructure 102 may include containers and services to process jobs in isolated partitions of a single kernel running directly on the physical hardware. For example, cgroups and namespaces, and other kernel technologies can be used to isolate, secure and manage partitions for jobs. Embodiments are not limited in this manner.

In embodiments, the infrastructure 102 includes resources and services to process jobs associated with data pipelines. As illustrated, the infrastructure 102 may support any number of data pipelines 104 and jobs associated with those data pipelines 104. In embodiments, a data pipeline 104 may include jobs to process data produced by applications, devices, or humans. The data pipelines 104 further include processes that control and enable data flow between two or more systems. For example, data pipelines 104 include a set of instructions that determine how and when to move data between these systems. A data pipeline may integrate data from multiple sources or data storage for processing by a system and perform data quality checks or standardize data. A data pipeline may also apply data security-related transformations, including masking, anonymizing, or encryption, conduct match, merge, master, and make entity resolution, and sharing data with partners and customers in the required format. Consumers of a data pipeline may include data warehouses like Redshift, Snowflake, SQL data warehouses, or Teradata, reporting tools like Tableau or Power BI, and other applications in the case of application integration or application migration. Consumers may also include Data lakes on Amazon S3, Microsoft ADLS, or Hadoop—typically for further exploration, artificial intelligence algorithms, and temporary repositories or publish/subscribe queues like Kafka for consumption by a downstream data pipeline. Embodiments are not limited to these examples.

In embodiments, the infrastructure 102 and data pipelines 104 may be controlled and monitored by a central system or one or more servers, such as orchestrator 106. For example, the orchestrator 106 may manage interconnections and interactions among jobs or workloads on the infrastructure 102. The orchestrator 106 may connect automated tasks into a cohesive job to accomplish a goal and produce a result, with permissions oversight and policy enforcement.

Figure 2:
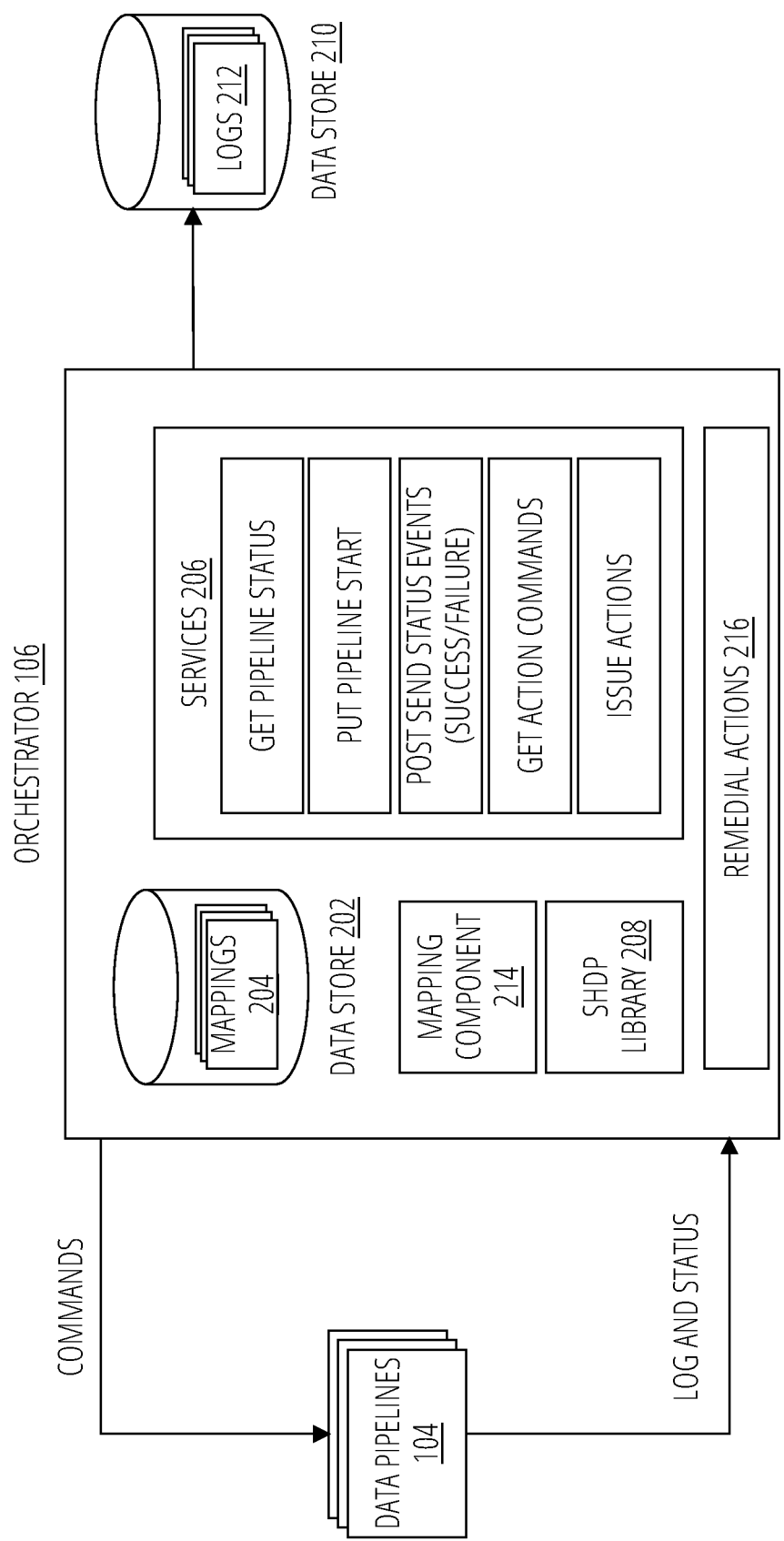
FIG. 2 illustrates an example of an orchestrator 106 in accordance with embodiments discussed herein.

In embodiments, the orchestrator 106 may be used to provision, deploy or start servers, acquire and assign storage capacity, manage networking, create virtual machines (VMs), and access specific software on cloud services. Further, the orchestrator 106 may control the resources while integrating permission checks for security and compliance. In embodiments, the orchestrator 106 may control the infrastructure 102 by issuing commands and instructions to the infrastructure 102, and invoking functions or modules to run processes to control and monitor the infrastructure 102. The orchestrator 106 may also collect data from the infrastructure 102, including logs and status indications that provide information such as the statuses of the data pipelines 104, indications of failure events, information corresponding to the failures, identifications of the data pipelines 104 experiencing the failure event, and so forth. FIG. 2 illustrates a detailed view of the orchestrator 106.

FIG. 2 illustrates an example of an orchestrator 106 configured to monitor infrastructure 102 and data pipelines 104, detect failure events, and issue remedial actions when a failure event occurs. FIG. 2 illustrates orchestrator 106 having a limited number of components for simplification purposes. In implementation, the orchestrator 106 may including a number of computing components not illustrated in FIG. 2. For example, the orchestrator 106 may be implemented in one or more servers and include one or more processors, memory, networking interfaces, input/output (I/O) devices, display devices, controllers, storage, and other computing components to perform the operations discussed herein.

In embodiments, the orchestrator 106 may be coupled with the infrastructure 102 via one or more connections, such as network connections, local or through the Internet. One or more connections may include wired and wireless networking connections, for example. The orchestrator 106 may communicate data with the infrastructure 102 via the one or more connections, including issuing commands and receiving status data, including logs and indications of failure events.

In embodiments, the orchestrator 106 may be configured with one or more programs or services 206 that may be used to control and monitor the infrastructure 102 and data pipelines 104. For example, the services 206 may include commands or instructions to determine a status of a pipeline (GET PIPELINE STATUS), initiate a pipeline (PUT PIPELINE START), and configure the data pipelines 104 to provide status events (POST SEND STATUS EVENTS). Each of these services may be targeted and include an identifier of a particular data pipeline or may be broadcasted and communicated to all of the data pipelines 104. For example, the orchestrator 106 may initiate one or more of the services 206 to get a status of a particular pipeline by using the GET PIPELINE STATUS service and include an identifier to identify the particular pipeline. The identifier may include a name of the data pipeline, an address or subnet for the data pipeline, a job or workload identifier, a process identifier, and so forth. In another example, the orchestrator 106 may issue the POST SEND STATUS EVENTS command to get the status of all of the data pipelines 104 by broadcasting the command to all of the data pipelines 104 using a broadcast address or identifier. Embodiments are not limited in this manner.

In embodiments, the orchestrator 106 may monitor the data pipelines 104 and determine the status of each of the data pipelines. Further, orchestrator 106 may detect or determine a data pipelines 104 is experiencing a failure event based on the data received from the data pipelines 104 and the infrastructure 102. Examples of data pipeline failures can be categorized into three different failure categories: (1) Infrastructural Failures, (2) External Dependency Failures, and (3) Data Issue Failures. Examples of Infrastructure Failures include, but are not limited to, a complete region failure, a service outage (e.g., the Simple Storage Service (S3) not being available), insufficient instance types being available in a given region, insufficient IP addresses being available in a given subnet, network congestion, etc. Example of External Dependency Failures include but are not limited, an upstream dataset not being available (e.g., service level agreement (SLA) breach), APIs being down or inaccessible (e.g., a 503 error), timeouts, etc. Examples of Data Issue Failures include, but are not limited to, data being corrupted or malformed, data quality is insufficient for processing (e.g., missing or invalid values), data inaccessible (e.g., revoked access), and so forth.

In embodiments, the orchestrator 106 includes a Self-Healing Data Pipeline (SHDP) Library 208 that can be imported and leveraged into a data pipeline and can be used to aid with error handling. The SHDP Library 208 includes error types that will be understood by the orchestrator 106. Table 1 illustrates the error types defined in the SHDP Library 208 and their descriptions.

TABLE 1

| Error Type | Description |
|---|---|
| COMPLETE_REGION_FAILURE | All services within a region are inaccessible |
| S3_OUTAGE | Simple Storage Service (S3) outage or inaccessible. Can be based on AWS alert or fatal error when invoking s3 APIs. Similar identifier can be defined for other AWS Services (e.g. EC2_OUTAGE, DYNAMODB_OUTAGE, SNS_OUTAGE) |
| CLUSTER_INSUFFICIENT_IP_AVAIL | No Internet Protocol (IP) addresses available in the current subnet |
| CLUSTER_INSUFFICIENT_INSTANCE_AVAIL | No instance types available in the current region/vpc/subnet |

TABLE 1-continued

| Error Type | Description |
| --- | --- |
| UPSTREAM_DATA_NOT_EXISTS | Data does not exist and indicates a breach of SLA |
| API_SERVER_ERROR | API returns a server-side error (i.e. 503, 50X) |
| DEPENDENCY_TIMEOUT | All-encompassing error type to indicate some timeout. This generic timeout can be based on an API error, failing to read data given timeout configuration, etc. |
| ACCESS_DENIED | Process unable to access some data or API service. |
| MALFORMED_DATA | Data source is corrupt and cannot be read |
| FAILED_DATA_QUALITY_I | Internally produced data failed configured data quality rules. Internally produced is defined as data produced by the same owner of the failing data pipeline |
| FAILED_DATA_QUALITY_E | Externally produced data failed configured data quality rules. Externally produced is defined as data produced by a different owner of the failing data pipeline |

The data pipelines 104 and infrastructure 102 may detect an error or failure event and utilize the SHDP Library 208. One of the error types listed in table 1 to communicate to the orchestrator 106. The data may include the error type, and identification information to identify the data pipeline and/or infrastructure 102 where the failure event occurred. The data may also include other information, such as a timestamp of the occurrence, information related to the failure (e.g., IP address(es), subnets, data identifiers, a description, and so forth).

The services 206 may also include commands or instructions that can be issued to resolve failure events. For example, the orchestrator 106 may also include one or more services 206 to determine a remedial action to perform in an attempt to resolve the failure event. Specifically, the services 206 may include a GET ACTION COMMANDS service that may be utilized by the orchestrator 106 to determine a remedial action corresponding to the failure event. In embodiments, the get action command service may perform a lookup in a data store 202 to determine mappings between the failure event and one or more remedial actions that may be attempted to resolve the failure event.

In embodiments, the data store 202 may be any type of repository configured to persistently store and manage data collection, including the mappings 204. In some instances, the data store 202 may store the mappings 204 in a database, but embodiments are not limited in this manner, and the mappings 204 may be stored in other store types, such as a text-based file, a distributed data store, a spreadsheet, and so forth. The database may be any type of database, such as a relational database, an object-oriented database, a NoSQL database, a distributed database, and so forth.

The mappings 204 may include a list of error type or failure events and corresponding remedial actions, including immediate actions and fatal actions. In some instances, a failure event may only correspond to a fatal action, e.g., failover the system to a different infrastructure 102 in a different location. However, other failure events may include any number of immediate actions and then a fatal action to perform as a last resort. The GET ACTION COMMANDS service may keep a count value of how many attempts to resolve the failure event have been performed and whether the remedial action was successful. The GET ACTION COMMANDS, utilizing the count, may determine which actions (immediate-n or fatal) to perform. FIG. 3A and FIG. 3B illustrate an example of mappings 204 between an error type or failure event and one or more remedial actions to be performed. The mappings 204 may be further divided into types, e.g., infrastructure type, dependency type, and data issue type.

As illustrated in FIG. 3A/3B, the mappings 204 map the error type or failure event to one or more remedial actions. For example, the first error type "COMPLETE_REGION_FAILURE" includes one immediate action, e.g., SYSTEM_FAILOVER_TO_SECONDARY," and a fatal action, e.g., "NOTIFY_STAKEHOLDER." Thus, when the orchestrator 106 first receives a failure event corresponding to a data pipeline indicating that a region failed (i.e., COMPLETE_REGION_FAILURE), the orchestrator 106 may determine the immediate remedial action to perform from the mappings 204 (i.e., SYSTEM_FAILOVER_TO_SECONDARY). The orchestrator 106 may determine whether the attempt to resolve the failure event is successful or not successful. If the attempt is successful, the orchestrator 106 may do nothing further. However, if the attempt is not successful, the orchestrator 106 may determine the next remedial action to perform. In this example, the next remedial action is the fatal action "NOTIFY_STAKEHOLDER." In other instances, for different failure events, the orchestrator 106 may go through a number of remedial actions to perform for a given failure event.

In some embodiments, the orchestrator 106 also includes a service 206 that may be used to invoke a particular remedial action. Specifically, the orchestrator 106 may include an ISSUE ACTIONS service that is configured to call or initiate a remedial action from the remedial actions 216. The remedial action initiated is the action determined based on the lookup performed with the mappings 204. In embodiments, the service may call or initiate a remedial action from the remedial actions 216. The remedial actions 216 may be one or more functions or modules that may be initiated with one or parameters, such as an identifier to identify the data pipeline having a failure event, an identifier to identify the location or infrastructure 102 where the pipeline is executing, and so forth. Table 2 illustrates a non-exhaustive list of remedial actions 216 that may be performed, their respective parameters, and a description.

| Remedial Action | Description |
| --- | --- |
| SYSTEM_FAILOVER_TO_SECONDARY (Region currentRegion, Region secondaryRegion) | This module will failover to the secondary region including cluster and any reference to data sources. The module will also resubmit failed job to secondary region. This module accepts the current region, and the secondary (new) region as parameters. |
| CYCLE_SUBNET (List subnets, Int numOfInstances) | This module accepts a list of subnets and a number of instances for each subnet as parameters. And the model, given a list of subnets, will identify which subnet has the required number of instances available and include some buffer for resources being utilized by other applications in the same AWS account. |
| DELAY_X_MIN (Int minutes) | This module will delay corrective action for X minutes, and accept a number of minutes as a parameter. |
| NOTIFY_STAKEHOLDERS | This module will trigger failure alert notifying engineers on call via PagerDuty and posting any fatal errors (via email/slack). In some instances, the module may accept a contact identifier (email address/username/phone number/etc.) as a parameter. |
| RETRY | This module resubmits the failing job |
| OPEN_TICKET_API | Pages an incident management system and opens a ticket for the owner of the failing API |
| OPEN_TICKET_DATA | Pages the incident management system opens a ticket for the owner of the data. |
| EXTRACT_AND_LOG | This module will extract and log any data quality issues. The extraction will remove and log any rows that have failed data quality checks. A new dataset will be created excluding the failed rows. This allows the job to be resubmitted excluding any failed rows. These failed rows will need to be remediated and re-processed as needed. |

In embodiments, the orchestrator 106 may perform one or more remedial actions for a given failure event until the failure event is resolved or the fatal action is performed. The orchestrator 106 may also log and store data associated with each failure event. For example, the orchestrator 106 may be coupled to a data store 210, which may be configured to store logs 212 associated with the failure event. In embodiments, the data store 210 may be any type of data store, such as a database or a file. In some embodiments, the data store 210 may be the same as data store 202. Embodiments are not limited in this manner.

The logs 212 may store data associated with each failure event, including, but not limited to, data to identify the failure event (error type), data to identify each of the remedial actions performed, and an indication of the successful remedial action and unsuccessful remedial actions. When the fatal action is performed, the logs 212 may store an indication that the failure event was resolved with the fatal action. In embodiments, the logs 212 may store additional information associated with the failure event. For example, the logs 212 may store a timestamp associated with an event, a location (infrastructure 102) identifier, a data pipeline identifier, and system metrics. The system metrics may include memory usage, processing usage, network traffic, etc., at the time of the failure event. Embodiments are not limited in this manner. Further and as will be discussed in more detail, the data in the logs 212 may be utilized by the orchestrator 106 to train a model and determine mappings between the failure events and the remedial actions.

In embodiments, the orchestrator 106 may include a mapping component 214 that may be used to generate the mappings 204 between the failure events and the remedial actions. In some instances, the mappings 204 may be defined in the system via a configuration file based on prior experience and knowledge of which remedial actions work for particular failure events. An administrator may provide the mappings to the mapping component 214 in a file, and the mapping component 214 may populate the mappings 204 in the data store 202. The file may be a format configured for the data store 202, including a simple text format, a spreadsheet format (CSV), and so forth.

In some instances, the mapping component 214 may utilize machine-learning to train a model to generate the mappings 204 based on historical data. For example, a model may be trained with historical failure events and remedial actions performed that were successful and not successful. Based on the training of the model, a probability of success to resolve a particular failure event may be associated with each remedial action. The probability of success may be combined with other criteria to determine the mappings 204 for each failure event. The other criteria may include a cost score associated with each of the remedial action which may take into account a resource cost to perform the remedial action, e.g., actions that require a higher number of resources (processing/memory/storage/ networking/etc.) may be assigned a higher cost score than actions that require a lower number of resources, and vice versa. The cost score may be combined with the probability of success to determine an overall value for the remedial action used by the mapping component 214 to generate the mappings 204. In one specific example, a first remedial action may have a probability of success of 80% (or 0.8) and a cost score of 4 (indicating a less efficient resource cost). A second remedial action may have a probability of success of 80% (0.8) and a cost of 10 (indicating a relatively high-efficiency cost). In this example, the total score for the first action may include multiplying the probability of success (0.8) by the cost score (5) to generate a total score of four (4). Similarly, the total score for the second action may be eight (8=0.8*10). Thus, the mapping component 214 may generate a mapping that performs the second action before the first action because the overall value for the second action is higher than the first action. In embodiments, the mapping component 214 may utilize the total score to generate the mappings 204. For example, the mapping component 214 may first try remedial actions for a failure event with a higher total score than actions with a lower total score. The mapping component 214 may also set a floor for the remedial actions that may be performed for the specific action, e.g., only trying remedial actions with a total score above a threshold value. This ensures that the orchestrator 106 does not waste time trying actions that are unlikely to succeed to resolve the failure. Note that embodiments are not limited the specific scoring example, and other weighting techniques may be utilized that consider the probability of success of an action to resolve a failure and the costs associated with that particular action.

Figure 4:
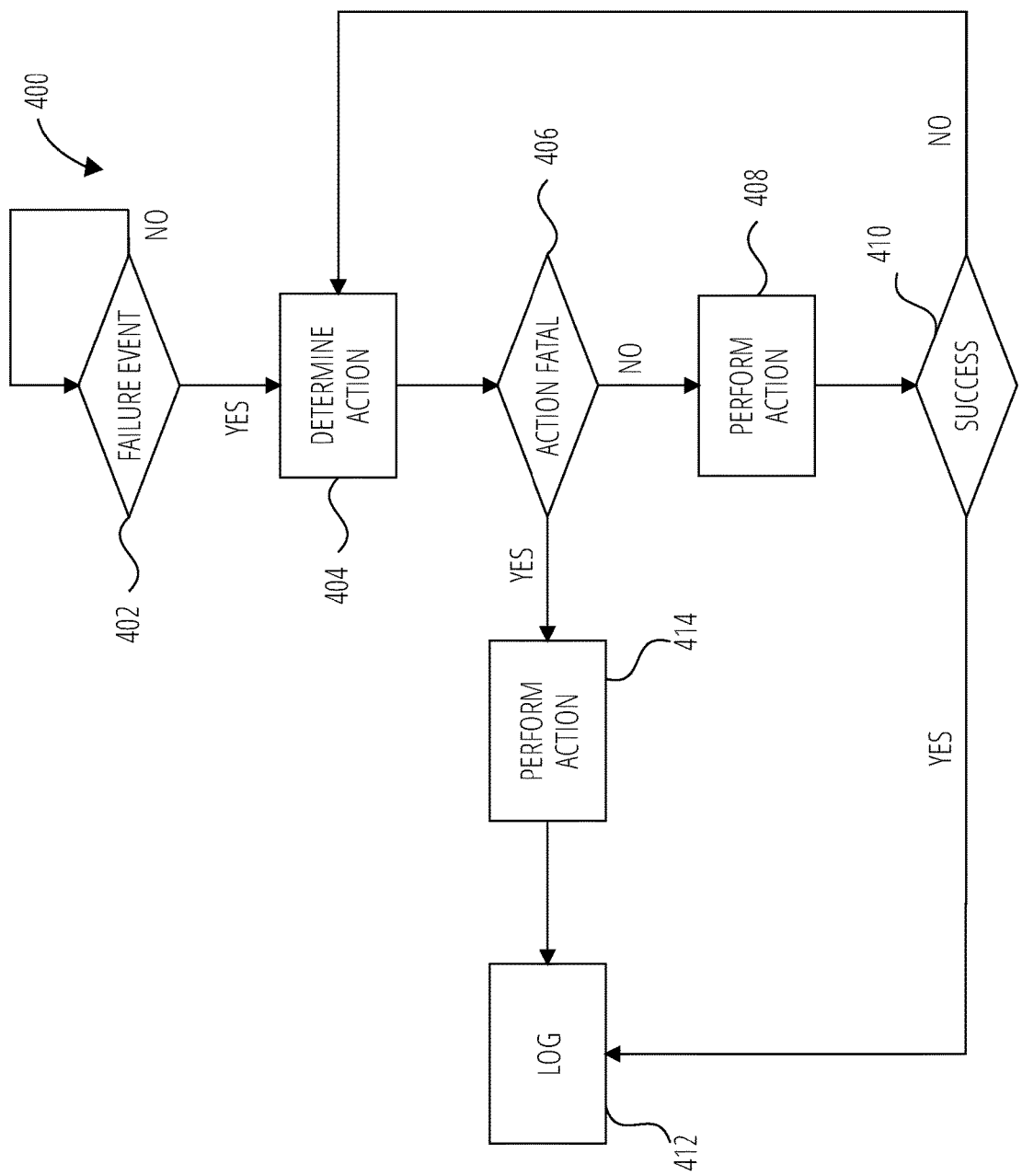
FIG. 4 illustrates an example of a logic flow 400 in accordance with embodiments.

FIG. 4 illustrates an example of a logic flow 400 to detect and resolve a failure event. In embodiments, the logic flow 400 may be performed by a system including the orchestrator 106 coupled with infrastructure 102 and data pipelines 104.

In embodiments, the logic flow 400 includes determining whether a failure event is detected or not detected at decision block 402. For example, the orchestrator 106 may monitor communications and data from the data pipelines 104 to determine the status of the data pipelines 104. As discussed, the data pipelines 104 may utilize a SHDP Library 208 to send a notification to the orchestrator 106 when a failure event occurs. For example, the data pipelines 104 may send a message including an error type indication to the orchestrator 106 based on the definitions in the SHDP Library 208. If a failure event is not detected or the orchestrator 106 does not receive an indication of a failure event, the logic flow 400 may continue to monitor for failure events.

If a failure event is detected, the logic flow 400 includes determining a remedial action to perform in an attempt to resolve the failure event at block 404. Specifically, the orchestrator 106 may perform a lookup in the mappings 204 to determine an action corresponding to the failure event. Each failure event may have corresponding remedial action(s), as found in the example mappings 204 illustrated in FIGS. 3A/3B. The remedial actions may include immediate actions and fatal actions. Generally, immediate actions are less costly resource-wise than fatal actions. Typically, a failure event has one or more immediate actions that may be performed and a fatal action. However, in some instances, the failure event may only have a fatal action. The failure events that have just fatal actions may be more severe, such as a data access failure, and require a more costly action to resolve the issue than other events.

At decision block 406 the logic flow 400 includes determining if the remedial action performed is an immediate action or a fatal action. If the action is fatal, the orchestrator 106 may perform the action at block 414 by utilizing the issue action service, which may include calling a module and passing parameters for the particular action to perform. At block 412, the logic flow 400 includes logging the data associated with the failure event, the remedial action(s) performed, and the results of each remedial action performed.

If the action to be performed is not fatal at decision block 406, the logic flow 400 includes performing the immediate remedial action at block 408 by the orchestrator 106. Again, the orchestrator 106 may use the issue action service to call or invoke a module for the remedial action and pass any required parameters to perform the action.

At decision block 410, the logic flow 400 includes determining whether the immediate remedial action is successful or not successful. If the action is successful, the logic flow 400 includes logging the data at block 412. The log may include data associated with the failure event, remedial action(s) performed, and an indication of the successful/unsuccessful remedial action(s). If the remedial is not successful at decision block 410, the logic flow 400 may continue to try different remedial actions until the failure event is resolved or the fatal action is performed.

Figure 5:
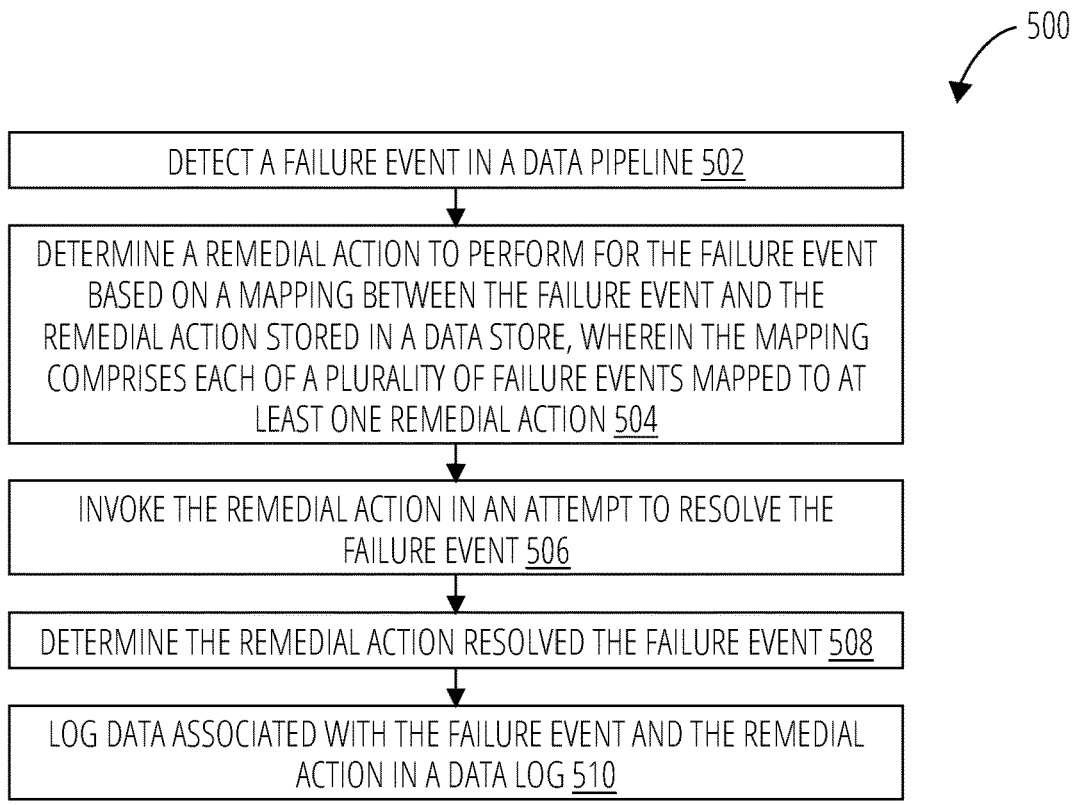
FIG. 5 illustrates a routine 500 in accordance with embodiments.

FIG. 5 illustrates an example routine 500 that may be performed by a system described herein, such as an orchestrator 106, to detect a failure event and to perform a remedial action to resolve the event.

In block 502, routine 500 detects a failure event in a data pipeline. For example, the orchestrator 106 may receive a communication from infrastructure 102 and/or a data pipeline indicating that a failure or error has occurred. The communication may include data indicating the error type, such as those defined in table 1.

In block 504, routine 500 determines a remedial action to perform for the failure event based on a mapping between the failure event and the remedial action stored in a data store. The mapping includes each of a plurality of failure events mapped to at least one remedial action. For example, the orchestrator 106 may perform a lookup utilizing data from the infrastructure 102 and/or data pipeline to determine associated or corresponding remedial actions that may be performed to resolve the failure or error. In one example, the lookup may include utilizing the action command service to perform a database query utilizing the identified failure in the query to determine associated remedial actions. The result of the query may return the associated actions, for example.

In block 506, routine 500 invokes the remedial action in an attempt to resolve the failure event. The orchestrator 106 may determine a remedial action to perform based on the results of the lookup. In one example, remedial actions may be provided in an order based on a probability of success weighted with the cost associated with the action. The orchestrator 106 may determine to perform an immediate action based on a high probability of success (%>threshold value), and a lower cost associated with the action. In some instances, the actions for a failure or error may be stored in an order based on the probability and cost, and the orchestrator 106 may perform the actions in the order until the issue is resolved, e.g., 1st immediate action→2nd immediate action→resolved, 1st immediate action→resolved, fatal action→resolved, etc.

The orchestrator 106 may utilize an issue action service to call a module corresponding to a remedial action to be performed to invoke the action. In some instances, the orchestrator 106 may pass one or more parameters to the module to perform the action. Table 2 lists examples of modules that may be called including parameters that may be passed to the modules in the attempt to resolve the failure or error.

In block 508, routine 500 determines the remedial action resolved the failure event. After the remedial action is performed, the orchestrator 106 may determine whether the attempt is successful or not successful. In one example, the orchestrator 106 may receive an indication from the infrastructure 102 and/or data pipeline indicating whether the failure or error is resolved. The indication may indicate that the status of the affected pipeline is ok if the failure or error is resolved, and indicate the failure or error if it persists. In this routine 500, the remedial action resolved the failure event.

In block 510, routine 500 logs data associated with the failure event and the remedial action in a data log. The orchestrator 106 may log an indication of the failure event, each of the remedial actions performed and whether they are successful or not successful in the logs 212 and store the logs 212 in a data store 210. The logs may be used to retrain the model and update the mappings 204. Specifically, data collected over time may indicate that particular remedial actions are more successful than other remedial actions for a failure event. The orchestrator 106 may update the mappings 204 based on the model and new data, e.g., add/remove actions, rearrange an order of actions, etc.

Figure 6:
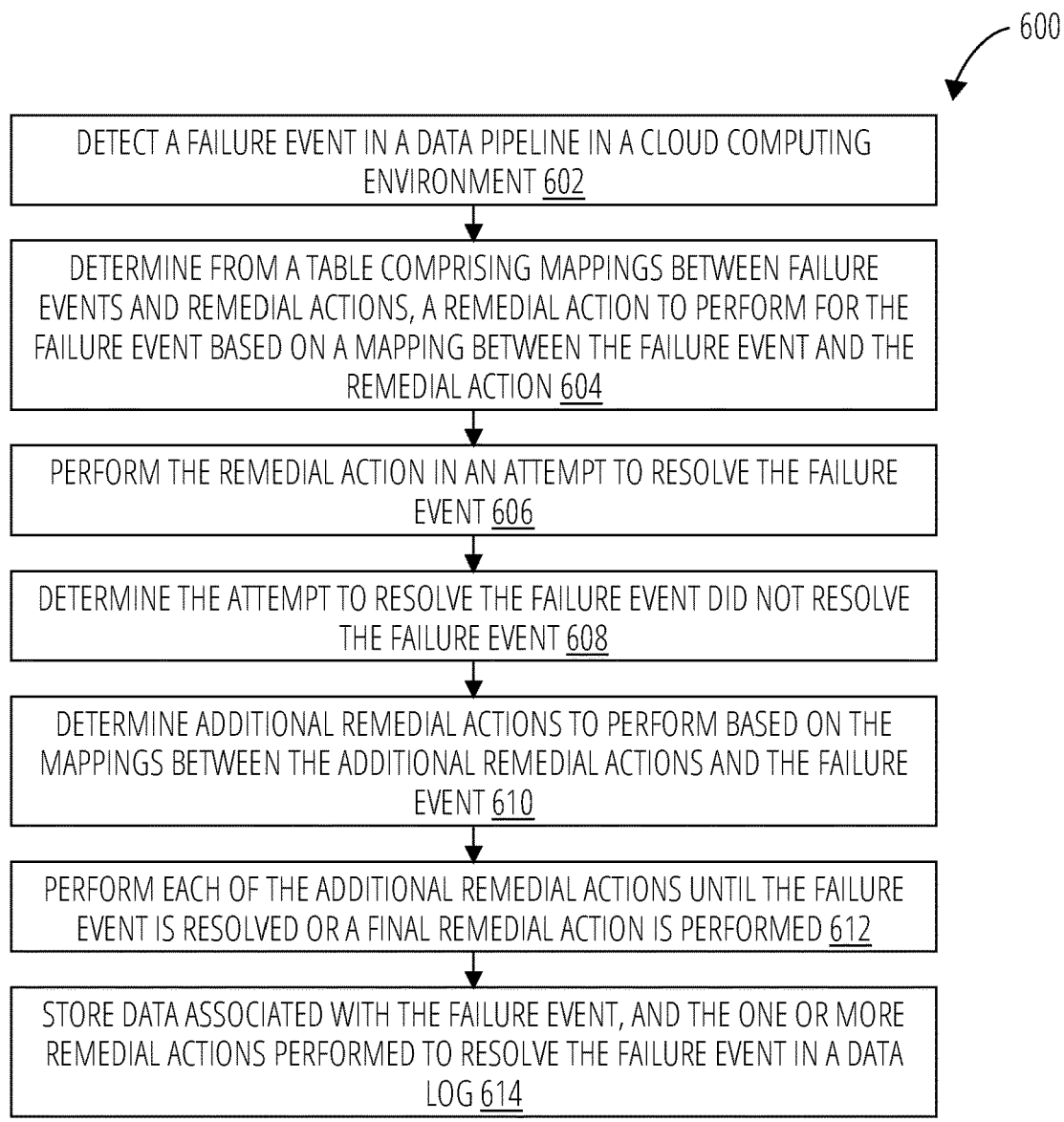
FIG. 6 illustrates a routine 600 in accordance with embodiments.

FIG. 6 illustrates an example of a routine 600 that may be performed by a system to detect a failure event and repeatedly attempt remedial actions to resolve the event.

In block 602, routine 600 detects a failure event in a data pipeline in a cloud computing environment. As discussed, a cloud computing environment, such as computing system 100, includes an orchestrator 106 configured to receive a communication from infrastructure 102 and/or a data pipeline indicating that a failure or error has occurred, the communication may indicate the error type using the error types defined in a SHDP Library 208, as illustrated in Table 1.

In block 604, routine 600 determines from a table comprising mappings between failure events and remedial actions, a remedial action to perform for the failure event based on a mapping between the failure event and the remedial action. As discussed, the orchestrator 106 may perform a lookup utilizing the data from the infrastructure 102 and/or data pipeline to determine associated or corresponding remedial actions that may be performed to resolve the failure or error.

In block 606, routine 600 performs the remedial action in an attempt to resolve the failure event. For example, the cloud computing environment including the orchestrator 106 may determine a remedial action to perform based on the results of the lookup. To perform the action, the orchestrator 106 may utilize one of the services 206, such as the issue action service, to call a module corresponding to a remedial action to be performed. In some instances, the orchestrator 106 may pass one or more parameters to the module to perform the action.

In block 608, routine 600 determines the attempt to resolve the failure event did not resolve the failure event. For example, the cloud computing environment including orchestrator 106 may receive a communication indicating that the attempt to resolve the failure or error did not work. For example, the communication may again include an error type to identify the error or failure based on the SHDP Library 208 definitions.

In block 610, routine 600 determines additional remedial actions to perform based on the mappings between the additional remedial actions and the failure event. In some instances, the orchestrator 106 may perform additional lookups in the data store to determine the next remedial action to perform the particular for the failure event. The 'next' remedial action may be based on the previous action and the orchestrator 106 may keep track of how many remedial actions have been performed for a given failure event using a counter value. In some instances, the orchestrator 106 may receive all of the remedial actions to perform based on the initial lookup performed and determine the next remedial action. As mentioned, the remedial actions may be provided in order based on a probability of success weighted with the cost associated with the action. The orchestrator 106 may perform the actions in the order until the issue is resolved, e.g., 1st immediate action→2nd immediate action→resolved, 1st immediate action→resolved, fatal action→resolved, etc. At block 612, routine 600 performs each of the additional remedial actions until the failure event is resolved or a final remedial action is performed.

In block 614, routine 600 stores data associated with the failure event, and the one or more remedial actions performed to resolve the failure event in a data log. As mentioned, orchestrator 106 may log an indication of the failure event, each of the remedial actions performed, whether they are successful or not successful in the logs 212 and store the logs 212 in a data store 210.

Figure 7:
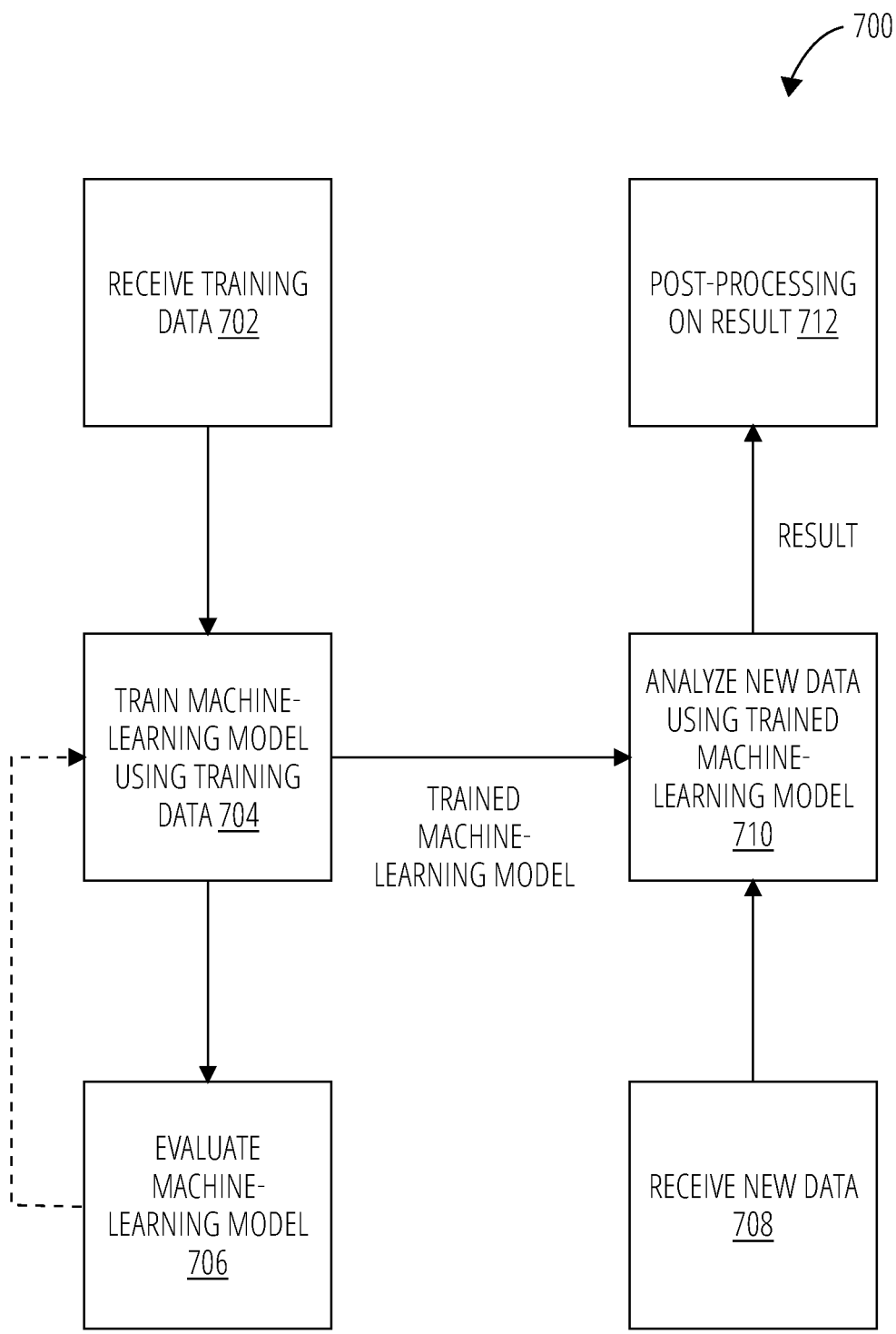
FIG. 7 illustrates an example of processing flow 700 to perform machine-learning operations.

FIG. 7 is a flow chart of an example of a process 700 for generating and using a machine-learning model according to some aspects discussed herein, e.g., determine immediate and fatal remedial actions to perform for failure events. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or determining remedial actions to perform for failure events in a data pipelines in a cloud computing environment.

Machine-learning models can be constructed through an at least partially automated (e.g., with little or no human involvement) process called training, as previously discussed. During training, input data, such as the failure events, remedial actions, indications of successful and unsuccessful actions for a given attempt, and performance costs can be iteratively supplied to a machine-learning model to enable the machine-learning model to identify patterns related to the input data or to identify relationships between the input data and output data. As discussed, embodiments include utilizing supervised and/or unsupervised training. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. The training may also incorporate a clustering technique to cluster or classify data into groups, e.g., customers with similar profiles.

In block 702, training data is received. In some examples, the training data is received from a remote database or a local database (datastores), constructed from various subsets of data, e.g., the failure events, remedial actions, indications of success/non-success, and costs. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In embodiments, the training data may include historical data based on data previously collected, e.g., in the logs 212. For example, the historical data may include information such as, historical failure events, remediation action attempts, result indications, associated costs, etc. The historical data may also include the profile of the previous collected data. This information may be used to train the models to predict future and/or real-time anomalies, for example. Embodiments are not limited in this manner.

In block 704, a machine-learning model is trained using the training data. The machine-learning model can be trained in a supervised, or semi-supervised manner. In supervised training, each input in the training data is correlated to a desired output. This desired output may be a scalar, a vector, or a different type of data structure. In semi-supervised training, only some of the inputs in the training data are correlated to desired outputs.

In block 706, the machine-learning model is evaluated. For example, an evaluation dataset can be obtained, for example, via user input or from a database or datastore. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 414, where the machine-learning model can be further trained using additional training data or otherwise modified to improve accuracy. If the machine-learning model has an adequate degree of accuracy for the particular task, e.g., determining remedial actions for failure events, the process can continue to block 708.

In block 708, new data is received. In some examples, the new data is received from one or more of infrastructure 102, data pipelines 104, one or more orchestrator(s) 106, other cloud computing environments, and so forth. The new data may be unknown to the machine-learning model. For example, the machine-learning model may not have previously processed or analyzed the new data. The new data may include information about a recent failure events and remedial actions, for example.

In block 710, the trained machine-learning model is used to analyze the new data and provide a result, updated mappings between failure events and remedial actions. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 712, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 8:
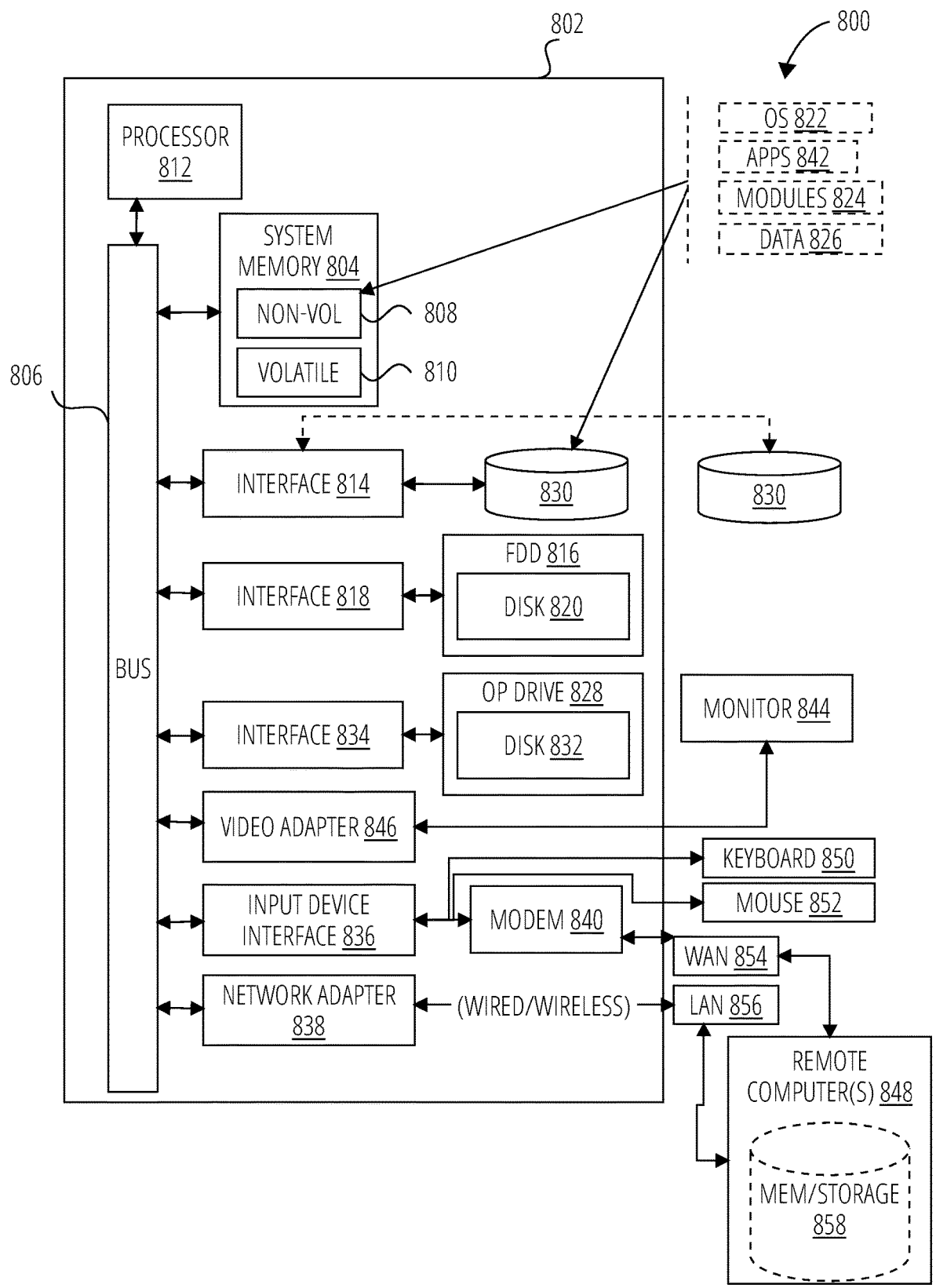
FIG. 8 illustrates a computer architecture 800 in accordance with one embodiment.

FIG. 8 illustrates an embodiment of an exemplary computer architecture 800 suitable for implementing various embodiments as previously described. In one embodiment, the computer architecture 800 may include or be implemented as part of one or more systems or devices discussed herein.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the 800 includes a processor 812, a system memory 804 and a system bus 806. The processor 812 can be any of various commercially available processors.

The system bus 806 provides an interface for system components including, but not limited to, the system memory 804 to the processor 812. The system bus 806 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile 808 and/or volatile 810. A basic input/output system (BIOS) can be stored in the non-volatile 808.

The computer 802 may include various types of computer-readable storage media in the form of one or more lower speed memory units, including an internal (or external) hard disk drive 830, a magnetic disk drive 816 to read from or write to a removable magnetic disk 820, and an optical disk drive 828 to read from or write to a removable The optical disk 832 (e.g., a CD-ROM or DVD). The hard disk drive 830, magnetic disk drive 816 and optical disk drive 828 can be connected to system bus 806 the by an HDD interface 814, and FDD interface 818 and an optical disk drive interface 834, respectively. The HDD interface 814 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 808, and volatile 810, including an operating system 822, one or more applications 842, other program modules 824, and program data 826. In one embodiment, the one or more applications 842, other program modules 824, and program data 826 can include, for example, the various applications and/or components of the systems discussed herein.

A user can enter commands and information into the computer 802 through one or more wire/wireless input devices, for example, a keyboard 850 and a pointing device, such as a mouse 852. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 812 through an input device interface 836 that is coupled to the system bus 806 but can be connected by other interfaces such as a parallel port, IEEE 1394 serial port, a game port, a USB port, an IR interface, and so forth.

A monitor 844 or other type of display device is also connected to the system bus 806 via an interface, such as a video adapter 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 802, although, for purposes of brevity, only a memory and/or storage device 858 is illustrated. The logical connections depicted include wire/wireless connectivity to a local area network 856 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 856 networking environment, the computer 802 is connected to the local area network 856 through a wire and/or wireless communication network interface or network adapter 838. The network adapter 838 can facilitate wire and/or wireless communications to the local area network 856, which may also include a wireless access point disposed thereon for communicating with the wireless functionality of the network adapter 838.

When used in a wide area network 854 networking environment, the computer 802 can include a modem 840, or is connected to a communications server on the wide area network 854 or has other means for establishing communications over the wide area network 854, such as by way of the Internet. The modem 840, which can be internal or external and a wire and/or wireless device, connects to the system bus 806 via the input device interface 836. In a networked environment, program modules depicted relative to the computer 802, or portions thereof, can be stored in the remote memory and/or storage device 858. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 9:
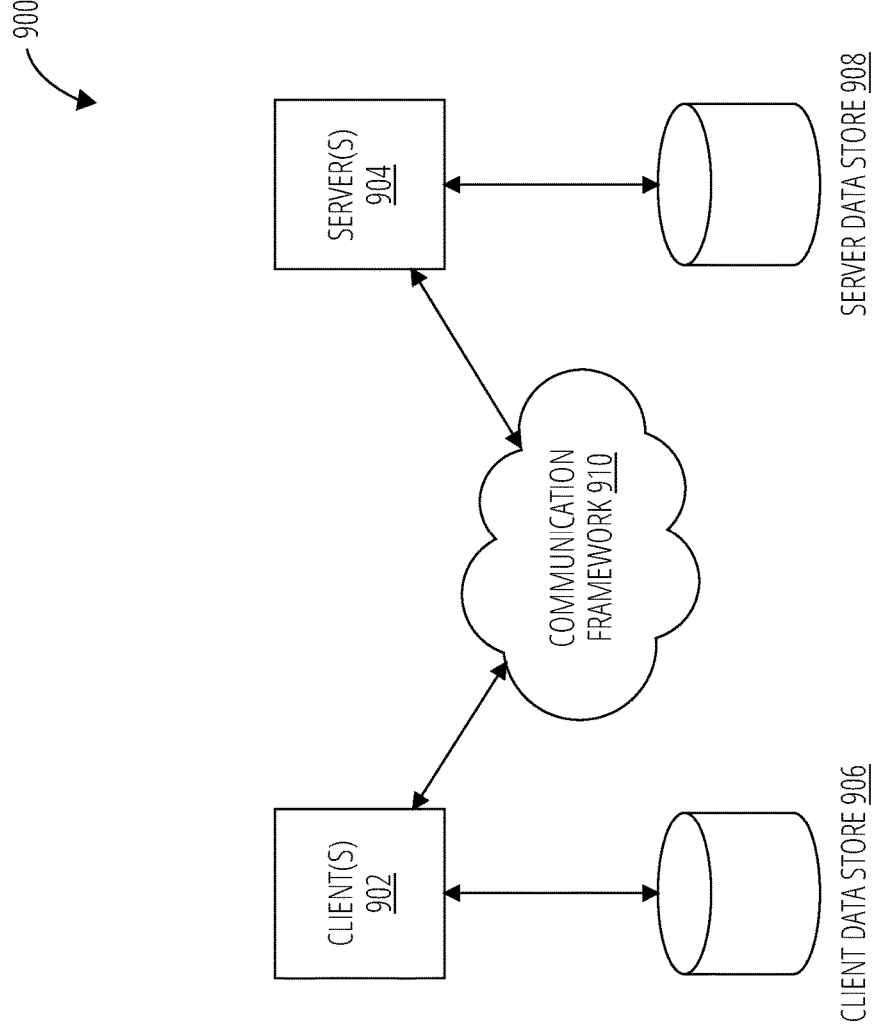
FIG. 9 illustrates a communications architecture 900 in accordance with one embodiment.

FIG. 9 is a block diagram depicting an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900, which may be consistent with systems and devices discussed herein.

As shown in FIG. 9, the communications architecture 900 includes one or more client(s) 902 and server(s) 904. The server(s) 904 may implement one or more functions and embodiments discussed herein. The client(s) 902 and the server(s) 904 are operatively connected to one or more respective client data store 906 and server data store 908 that can be employed to store information local to the respective client(s) 902 and server(s) 904, such as cookies and/or associated contextual information.

The client(s) 902 and the server(s) 904 may communicate information between each other using a communication framework 910. The communication framework 910 may implement any well-known communications techniques and protocols. The communication framework 910 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 910 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 082.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 902 and the server(s) 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

What is claimed is:

1. A computer system, comprising:
   a data store to store a table comprising mappings of failure events to remedial actions, wherein each of the remedial actions is classified into either a first category of immediate actions or a second category of fatal actions;
   one or more processors coupled with the data store; and
   memory comprising instructions that when executed by the one or more processors, cause the one or more processors to:
   detect one of the failure events in a data pipeline;
   perform a lookup in the table stored in the data store to determine a first of the remedial actions associated with the one of the failure events based on the mappings between the failure events and the remedial actions and based on a resource cost associated with the first of the remedial actions;
   determine if the first of the remedial actions is classified in the first category of immediate actions or the second category of fatal actions;
   cause performance of the first of the remedial actions in an attempt to resolve the one of the failure events;

if the first of the remedial actions is classified in the first category of immediate actions:
   determine if the first of the remedial actions resolved the one of the failure events;
   in response to the first of the remedial actions resolving the one of the failure events, log data associated with the one of the failure events and the first of the remedial actions in a data log; and
   in response to the first of the remedial actions failing to resolve the one of the failure events:
      perform a lookup in the table to determine a second of the remedial actions based on the mappings between the failure events and the remedial actions and based on a resource cost associated with the second of the remedial actions; and
      cause performance of the second of the remedial actions; and
if the first of the remedial actions is classified in the second category of fatal actions, log the data associated with the one of the failure events and the first of the remedial actions in the data log regardless of whether the first of the remedial actions resolved the one of the failure events.

2. The computer system of claim 1, the one or more processors to monitor a plurality of data pipelines including the data pipeline to detect instances of the failure events.

3. The computer system of claim 1, the one or more processors to log, in the data log, an indication for which of the remedial actions successfully resolved the one of the failure events, and each of the remedial actions attempted to resolve the one of the failure events.

4. The computer system of claim 1, wherein each of the failure events is one of an infrastructure failure type, an external dependency failure type, or a data issue failure type.

5. The computer system of claim 4, wherein the one of the failure events is the infrastructure failure type, and the first of the remedial actions is one of a system failover action, a cycle subnet action, a delay and cycle subnet action, or a notification action.

6. The computer system of claim 4, wherein the one of the failure events is the external dependency failure type, and the first of the remedial actions is one of a retry action, a delay and retry action, an open ticket action, or a notification action.

7. The computer system of claim 4, wherein the one of the failure events is the data issue failure type, and the first of the remedial actions is a log and retry action, a notification action, or an open ticket and notification action.

8. The computer system of claim 1, the one or more processors to:
   train a model with historical data comprising a plurality of historical failure events and a plurality of historical remedial actions; and
   utilize the model to generate the mappings between the failure events and the remedial actions.

9. The computer system of claim 8, the one or more processors to:
   update the model with the data in the data log for the one of the failure events; and
   periodically update the mappings between the failure events and remedial actions based on the model being updated.

10. A computer-implemented method, comprising:
   detecting a first failure event in a data pipeline;
   determining a first remedial action to perform for the first failure event based on a mapping between the first failure event and the first remedial action stored in a data store and based on a resource cost associated with the first remedial action, wherein the first remedial action is classified into either a first category of immediate actions or a second category of fatal actions;
   determining if the first remedial action is classified in the first category of immediate actions or the second category of fatal actions;
   invoking the first remedial action in an attempt to resolve the first failure event;
   if the first remedial action is classified in the first category of immediate actions:
      determining if the first remedial action resolved the first failure event;
      in response to the first remedial action resolving the first failure event, logging data associated with the first failure event and the first remedial action in a data log; and
      in response to the first remedial action failing to resolve the first failure event:
         determine a second remedial action to perform for the first failure event based on a mapping between the first failure event and the second remedial action stored in the data store and based on a resource cost associated with the second remedial action; and
         invoking the second remedial action in an attempt to resolve the first failure event; and
   if the first remedial action is classified in the second category of fatal actions, logging the data associated with the first failure event and the first remedial action in the data log regardless of whether the first remedial action resolved the first failure event.

11. The computer-implemented method of claim 10, comprising monitoring a plurality of data pipelines including the data pipeline to detect failure events, including the first failure event.

12. The computer-implemented method of claim 10, comprising logging, in the data log, an indication for a successful remedial action that successfully resolved the first failure event.

13. The computer-implemented method of claim 10, wherein the first failure event is one of an infrastructure failure type, an external dependency failure type, or a data issue failure type.

14. The computer-implemented method of claim 10, comprising:
   training a model with historical data comprising a plurality of historical failure events and a plurality of historical remedial actions; and
   utilizing the model to generate the mapping between the first failure event and the first remedial action.

15. The computer-implemented method of claim 14, comprising:
   updating the model with the data in the data log for the first failure event; and
   periodically updating the mapping between the first failure event and the first remedial action based on the model being updated.

16. A computer-implemented method, comprising:
   detecting a first failure event in a data pipeline in a cloud computing environment;
   determining a first remedial action to perform for the first failure event based on a mapping between the first failure event and the first remedial action, wherein the first remedial action is classified into either a first category of immediate actions or a second category of fatal actions;

determining if the first remedial action is classified in the first category of immediate actions or the second category of fatal actions;

performing the first remedial action in an attempt to resolve the first failure event;

if the first remedial action is classified in the first category of immediate actions:

determining if the first remedial action resolved the failure event;

in response to the first remedial action resolving the first failure event, storing data associated with the first failure event and the first remedial action in a data log; and in response to the first remedial action failing to resolve the first failure event, determining a second remedial action to perform for the first failure event based on a mapping between the second remedial action and the first failure event; and if the first remedial event is classified in the second category of fatal actions, storing the data associated with the first failure event and the first remedial action in the data log regardless of whether the first remedial action resolved the first failure event.

17. The computer-implemented method of claim 16, comprising monitoring a plurality of data pipelines including the data pipeline in the cloud computing environment to detect instances of failure events, including the first failure event.

18. The computer-implemented method of claim 16, wherein the first failure event is one of an infrastructure failure type effecting the cloud computing environment, an external dependency failure type effecting the data pipeline, or a data issue failure type effecting data to be processed by the data pipeline.

19. The computer-implemented method of claim 16, comprising:

training a model with historical data comprising a plurality of historical failure events and a plurality of historical remedial actions; and utilizing the model to generate the mapping between the first failure event and the first remedial action.

20. The computer-implemented method of claim 19, comprising:

updating the model with the data in the data log for the first failure event; and periodically updating the mapping between the first failure event and the first remedial action based on the model being updated.

* * * * *